United States Patent
Roedl et al.

(10) Patent No.: US 6,489,582 B1
(45) Date of Patent: Dec. 3, 2002

(54) NON-SUBMERSION ELECTRODISCHARGE MACHINING USING CONDITIONED WATER AS A MEDIUM

(75) Inventors: Lawrence Joseph Roedl, West Chester, OH (US); James Tu Dang, Crestview Hills; William David Farris, Union, both of KY (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 09/685,261

(22) Filed: Oct. 10, 2000

(51) Int. Cl.$^7$ .................................................. B23H 1/00
(52) U.S. Cl. .................................................. 219/69.17
(58) Field of Search .......................... 219/69.14, 69.17

(56) References Cited

U.S. PATENT DOCUMENTS

| | | | | |
|---|---|---|---|---|
| 3,600,546 A | * | 8/1971 | Niwa et al. ............... | 219/69.17 |
| 3,626,137 A | * | 12/1971 | Bertolasi ................. | 219/69.14 |
| 4,539,458 A | * | 9/1985 | Inoue ..................... | 219/69.17 |
| 4,590,352 A | * | 5/1986 | Inoue ..................... | 219/69.17 |
| 5,281,788 A | * | 1/1994 | Abiko et al. ............. | 219/69.14 |
| 5,418,345 A | * | 5/1995 | Adamski ................. | 219/69.17 |

FOREIGN PATENT DOCUMENTS

| | | | | |
|---|---|---|---|---|
| JP | 54-34197 A | * | 3/1979 | .............. 219/69.14 |

* cited by examiner

Primary Examiner—Geoffrey S. Evans
(74) Attorney, Agent, or Firm—David L. Narciso; Gregory O. Garmong

(57) ABSTRACT

A workpiece is electrodischarge machined using a machining apparatus having a workpiece holder, an electrode holder having an electrode mounted thereto, and a power supply providing an electrical voltage and current. The workpiece is mounted in the workpiece holder, and the electrode is positioned adjacent to a machining location of the workpiece. The method further includes furnishing a source of a flow of conditioned water, directing the flow of conditioned water from the source into the machining location of the workpiece, without submerging the machining location in a liquid, and applying a voltage from the power supply such that an electrical current flows between the workpiece and the electrode holder so that metal is removed from the workpiece into the flow of conditioned water.

20 Claims, 2 Drawing Sheets

NON-SUBMERSION ELECTRODISCHARGE MACHINING USING CONDITIONED WATER AS A MEDIUM

FIELD OF THE INVENTION

This invention relates to electrodischarge machining and, more particularly, to a technique for electrodischarge machining workpieces with holes therein without plugging the holes.

BACKGROUND OF THE INVENTION

In electrodischarge machining, often abbreviated as "EDM", an electrode is positioned adjacent to a machining location of a workpiece, with a small gap therebetween. An electrical current is passed between the workpiece and the electrode, and material is removed from the workpiece by a sparking discharge action. The machining location and the portion of the electrode adjacent to the machining location are immersed in a liquid dielectric electrodischarge medium. The liquid dielectric electrodischarge medium occupies the gap and aids in removing the residual material machined from the workpiece and cooling the workpiece. A typical liquid dielectric medium is an oil with a vegetable oil base.

Electrodischarge machining works well in many applications. In others, problems have been encountered. The inventors are interested in performing electrodischarge machining of weld-repair deposits at the tips of gas turbine blades. The gas turbine blades have holes for cooling air in the sides of the airfoil section. When these turbine blades are electrodischarge machined, the liquid medium leaks into the cooling holes of the turbine blade. The inventors have observed that, after the electrodischarge machining is complete, the liquid medium in the cooling holes is removed only with great difficulty. If complete removal is not effected, the residual liquid medium chemically reacts with chemicals present in the subsequent processing operations, such as detergents, and results in plugging of the cooling holes during further processing operations.

There has been previously proposed no approach for solving this problem. Masking of the cooling holes may allow reactive chemicals to remain, leading to their plugging in later steps of the processing. The use of many effective cleaning chemicals, such as trichloroethane, is not acceptable environmentally and may pose a health hazard. Accordingly, there is a need for an approach to electrodischarge machining in which small holes or openings in the workpiece are not plugged during or after the electrodischarge machining. The present invention fulfills this need, and further provides related advantages.

BRIEF SUMMARY OF THE INVENTION

The present invention provides an electrodischarge machine method and apparatus which is operable for electrodischarge machining but which overcomes the problem of the plugging of holes in the workpiece. The present approach may be implemented as a modification to conventional electrodischarge machines. The present approach yields excellent results, yet is environmentally friendly and safe.

A method for electrodischarge machining a workpiece comprises the steps of furnishing a machining apparatus comprising a workpiece holder, an electrode holder having an electrode mounted therein, and a power supply providing an electrical voltage and current. The workpiece is mounted in the workpiece holder, and the electrode is positioned adjacent to a machining location of the workpiece. The method further includes furnishing a source of a flow of conditioned water, directing the flow of conditioned water from the source into the machining location of the workpiece, without submerging (immersing) the machining location in a liquid, and applying a voltage from the power supply such that an electrical current flows between the workpiece and the electrode holder and metal is removed from the workpiece into the flow of conditioned water. The workpiece is not contacted by an oil during electrodischarge machining and is not contacted by a detergent during the post processing and cleaning steps.

Preferably, the electrode is positioned vertically above the workpiece. The step of directing the flow of conditioned water includes the step of directing the flow of conditioned water over a surface of the electrode so that the conditioned water flows downwardly over the machining location and a surface of the workpiece. To introduce the conditioned water, a plurality of water flow orifices may be provided in the electrode holder and positioned to direct the flow of water against a surface of the electrode.

The conditioned water used in the present approach is a partially deionized water having an electrical resistance of from about 10,000 to about 150,000 ohms per square centimeter, preferably from about 10,000 to about 100,000 ohms per square centimeter, and most preferably from about 10,000 to about 15,000 ohms per square centimeter.

The source of conditioned water desirably comprises a water flow orifice positioned to deliver conditioned water to the machining location, a reservoir of conditioned water, preferably in the form of a non-metallic catch basin, positioned to catch water that drips from the workpiece, and a pump that receives the water from the reservoir and delivers pressurized water to the water flow orifice. The water may be filtered and re-conditioned to remove bits of the material removed from the workpiece and any ionic components that are present, to restore it to its conditioned state prior to reuse by flow through the water flow orifice.

In a preferred application, the workpiece is a gas turbine blade, particularly a gas turbine blade having a cooling opening in an airfoil surface thereof. The machining location is a tip of a gas turbine blade, such as a tip to which a weld repair has been applied and which is to be electrodischarge machined to final form.

The present approach uses conditioned water as a medium for the electrodischarge machining. The workpiece and its machining location are not submerged in the conditioned water, but instead the conditioned water is continuously flowed over the surface of the workpiece and the machining location. The conditioned water provides a dielectric medium and also removes the machining remnants and heat from the vicinity of the machining location. There is nothing in this medium to foul the cooling holes in the workpiece in the case of a cooled- gas turbine blade. Accordingly, there is no need for masking or other protection applied to the gas turbine blade, or for any complex cleaning procedures following the electrodischarge machining. The electrodischarge machining of this approach is accomplished at rates comparable with those achieved in convention electrodischarge machining, with lesser adverse side effects.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
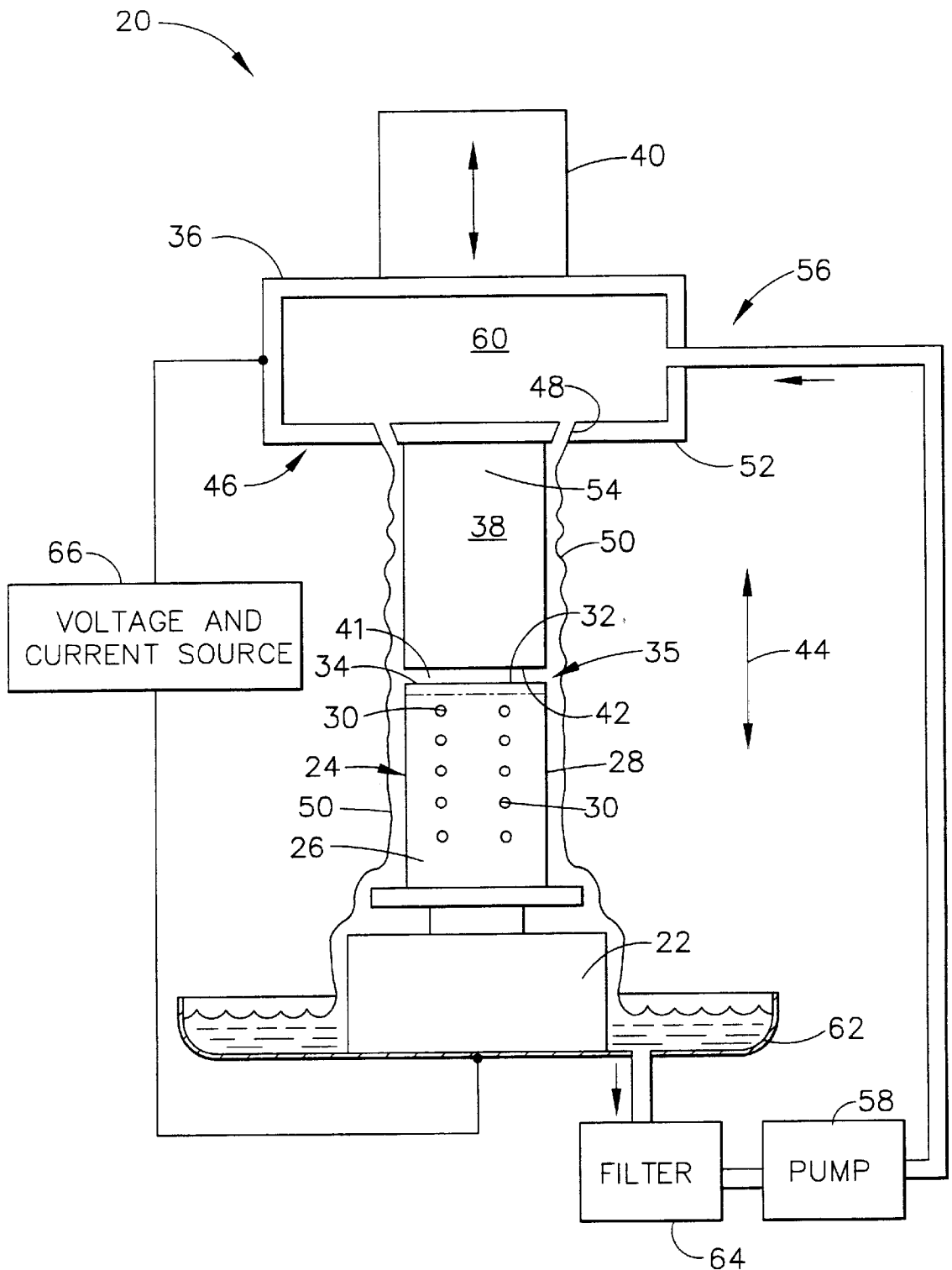
FIG. 1 is a schematic elevational view of an electrodischarge machine.

FIG. 1 depicts an electrodischarge machine 20 operable as a part of the present invention. The electrodischarge machine 20 includes a workpiece holder 22 that holds a workpiece 24. (The workpiece 24 is not itself a part of the electrodischarge machine 20, but the electrodischarge machine 20 is operable with the workpiece 24.) The presently preferred workpiece 24 is a gas turbine blade 26 having an airfoil section 28 with cooling holes 30 therein. The gas turbine blade 26 is made of a metal, preferably a nickel-base superalloy. The gas turbine blade 26 is at least partly hollow. In service, a flow of cooling air is forced through the hollow interior of the gas turbine blade 26 and passes through the cooling holes 30 to cool the gas turbine blade by a combination of heat conduction and film cooling.

In the application of most interest to the inventors, a tip 32 of the gas turbine blade 26 is formed of a bead 34 of a weld material. The bead 34 of weld material is previously applied to the exposed end of the gas turbine blade 26 to repair damage incurred during service. In the welding operation, the bead 34 is applied as closely as possible to the final desired shape and size, but it is not possible by available welding technology to achieve that shape and size as exactly as required for the aerodynamic shape. The electrodischarge machining is employed to final machine the weld bead 34 to the required shape and size. The tip 32 and the weld bead 34 thus serve as a machining location 35, from which material is to be removed, in the electrodischarge machining process. Conventional electrodischarge machining results in plugging of the cooling holes 30, and the present approach has been developed to overcome that problem.

The electrodischarge machine 20 includes an electrode holder 36 having an electrode 38 mounted thereto. The electrode 38 is preferably made of graphite and is shaped in cross sectional view to have the desired machined shape of the tip 32 of the gas turbine blade 26. The electrode holder 36 (or equivalently, the workpiece holder 22) is mounted to a drive 40 which controllably moves the electrode 38 and the tip 32 either closer together or farther apart. During the electrodischarge machining process, the electrode 38 and the tip 32 are separated by a gap 41, which is typically from about 0.001 inch to about 0.003 inch in width.

In the present approach, it is preferred, but not necessary, that the electrode 38 be vertically above the machining location 35 and in this case the tip 32. That is, a machining portion 42 of the electrode 38 is positioned so that the machining portion 42 and the tip 32 are aligned along a radius of the earth, numeral 44, which defines a vertical direction relative to the earth's surface. The preferred approach depicts the electrode 38 above the workpiece 24, but this may be inverted if desired so that the workpiece 24 is above the electrode 38. As noted, it is not necessary that the electrode 38 and the workpiece 24 be vertically aligned, although the vertical alignment allows the flow of conditioned water to serve as the electrodischarge machining medium and also as a coolant for the electrode 38 and the workpiece 24. Any approach that directs the flow of conditioned water to the machining location 35 is operable.

The electrodischarge machine includes a source 46 of a flow of conditioned water. The source 46 preferably has a plurality of water flow orifices 48 oriented to direct the flow of conditioned water into the machining location 35 and in this case into the gap 41 between the machining portion 42 and the tip 32. Most preferably, the flow of conditioned water is not directly from the water flow orifices 48 into the machining location. Instead, the water flow orifices 48 are positioned to direct the flow of conditioned water, numeral 50, first onto the electrode 38. The conditioned water 50 flows downwardly by the force of gravity along the side surfaces of the electrode 38, into the gap 41 by flow and capillary action, and further downwardly along the side surfaces of the airfoil section 28 of the gas turbine blade 26.

Figure 2:
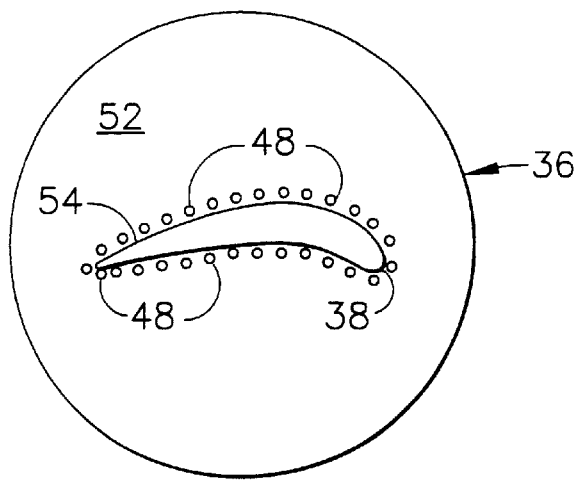
FIG. 2 is an enlarged bottom view of the electrode holder and electrode.

FIG. 2 is a bottom view of the electrode 38 and the electrode holder 36. The water flow orifices 48 in a bottom 52 of the electrode holder 36 are arranged around the perimeter of the electrode 38. The water flow orifices 48 are angled inwardly so that the conditioned water flow from the water flow orifices 48 is directed onto a side surface 54 of the electrode 38. From there the conditioned water flows downwardly as described previously.

The source 46 of the flow of conditioned water includes a pressure source of conditioned water, numeral 56. The pressure source includes a pump 58 which produces a flow of the conditioned water into a hollow interior 60 of the electrode holder 36, from which the conditioned water flows out the water flow orifices 48. In a prototype apparatus built and operated by the inventors to accomplish electrodischarge machining of turbine blades with a chord length of 1.75 inches, there were 32 water flow orifices 48, each of diameter about 0.015 inches, in the electrode holder 36, spaced around the perimeter of the electrode 38. The water pressure in the hollow interior 60 was about 30–40 pounds per square inch, and the total water flow rate through the water flow orifices 48 was about 1 gallon per minute.

After the water flow 50 has reached the bottom of the turbine blade 26, it flows to a catch basin or reservoir 62 made of a nonmetallic material such as a plastic. From the catch basin, the water is drawn into the pump 58 through a filter 64 which may include one or several individual filters. The filter 64 removes particulate such as the remnants of the machining process and also filters ionic species from the conditioned water using an appropriate filter such as an ion exchange filter. In the prototype apparatus, the particulate filter was sized to remove particulate larger than about 10 micrometers diameter. The filter 64 re-conditions the water as necessary to the conditioned state.

This closed-circuit water flow system was developed for commercial-scale operations. Alternatively, the conditioned water could be used for a single pass from a source, and discarded after the single pass.

The water used in the present approach must be conditioned water. The conditioned water used in the present approach is a partially deionized water having an electrical resistance of from about 10,000 to about 150,000 ohms per square centimeter, preferably from about 10,000 to about 100,000 ohms per square centimeter, and most preferably from about 10,000 to about 15,000 ohms per square centimeter. If tap water is used, the electrical resistivity is typically about 2,000–3,000 ohms per square centimeter, which is too low to permit the electrodischarge machining to proceed, It has been determined that the minimum electrical resistivity for the present approach to perform properly is about 10,000 ohms per square centimeter, and lower resistivities result in too high an electrical conductivity in the medium. If pure distilled water is used, the electrical resistivity is typically about $2.5 \times 10^7$ ohms per square centimeter, which is too high for the electrodischarge machining process. It has been determined that the maximum electrical resistivity for the present approach to perform properly is about 150,000 ohms per square centimeter. If the electrical resistivity exceeds that figure, the conductivity of the water is too low for the process to perform properly. If the electrical resistivity exceeds about 100,000 ohms per square centimeter but is less than about 150,000 ohms per square centimeter, the process is operable but performance degrades over time. The optimum resistivity range of the water in the process is from about 10,000 to about 15,000 ohms per square centimeter.

The conditioned water used in the present approach must flow past the machining location. It may not be stagnant. Accordingly, the workpiece 22 and machining location may not be submerged (immersed) in a bath of conditioned or other type of water, even if the bath is agitated. The conditioned water does not include any oils, which are employed in many conventional electrodischarge machining processes, but which can tend to produce plugging of small holes during subsequent processing steps in the manner discussed previously.

The electrodischarge machine further includes a power supply 66 with a voltage (and current) source connected between the electrode 38 and the workpiece 24. Most conveniently, the power supply 66 is connected between the electrode holder 36, which is in electrical communication with the electrode 38, and the workpiece holder 22, which is in electrical communication with the workpiece 24. The present approach employs the same voltages and currents used in conventional electrodischarge machining, which are well known in the art. In a typical case, the applied voltage is about 40–80 volts DC and the applied current is a maximum of about 3 amperes per square inch.

Figure 3:
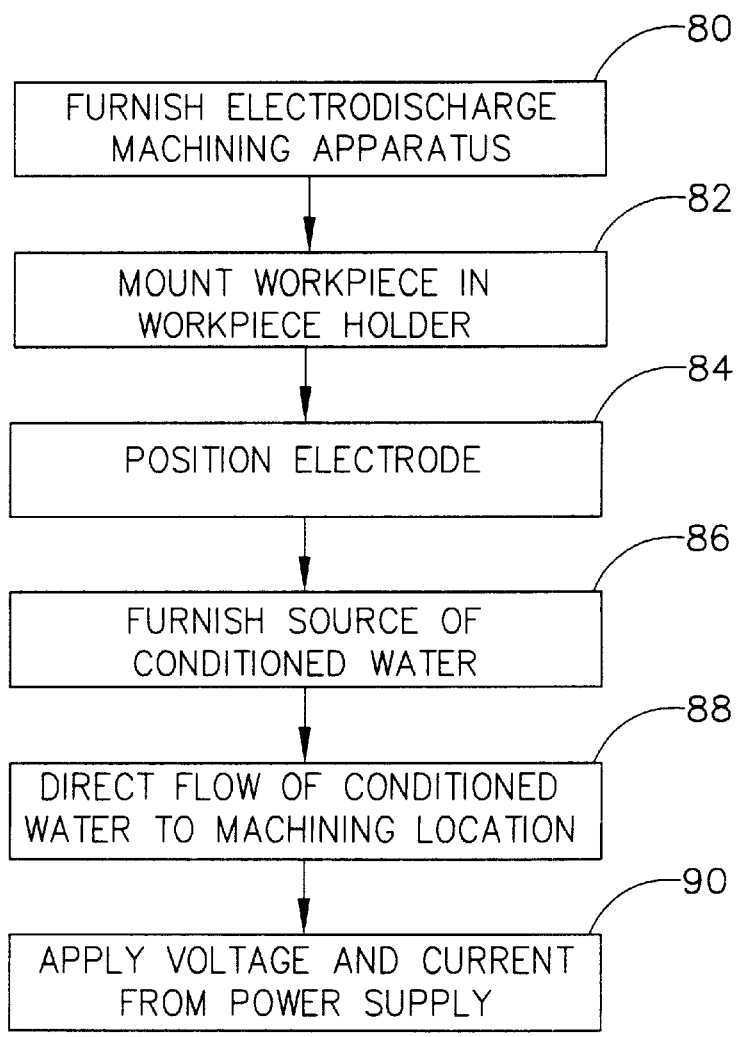
FIG. 3 is a block flow diagram of a preferred approach for practicing the present invention.

FIG. 3 depicts an approach for electrodischarge machining the workpiece. The electrodischarge machine is furnished, numeral 80. The electrodischarge machine is preferably the above-described electrodischarge machine 20 and the method will be described in relation to the electrodischarge machine 20, but any other operable electrodischarge machine may be used. The workpiece 24 is mounted in the workpiece holder, numeral 82. The electrode 38 is positioned adjacent to the machining location of the workpiece 24, numeral 84. Most preferably, the electrode 38 is aligned vertically above (or below) the workpiece 24, as described earlier. The source 46 of the flow of the conditioned water is furnished, numeral 86. The flow of conditioned water is directed to the machining location, numeral 88. The flow may be indirect along the electrode 38 and/or the workpiece 24, as discussed earlier, or direct In this process, the workpiece 24 and the machining location are not immersed in the conditioned water or any other liquid. The electrodischarge machining voltage is applied so that a current flows between the workpiece 24 and the electrode 38, and metal is removed from the workpiece into the flow of conditioned water 50, numeral 90. The electrodischarge machining is continued for as long a period as is necessary to complete the required metal removal.

The present invention has been reduced to practice on a prototype electrodischarge machine 20 as described earlier in relation to FIGS. 1 and 2, using the approach of FIG. 3. Excellent results were obtained, and cooling holes were not plugged in the overall process. Processing cycle times were reduced as compared with other approaches, and there were no repair costs to unplug cooling holes. In a prior approach using an oil-based electrodischarge machining medium, trichloroethane was used to remove the electrodischarge machining medium. The use of trichloroethane was later discontinued for environmental and health reasons. In a revised prior process, the oil-based electrodischarge machining medium was removed using a high-detergent soap. However, some of the oil and the soap could remain in the interiors of the cooling holes. The residual oil and soap chemically react together in the subsequent processing operations at elevated temperature, resulting in plugging of the cooling holes. In the present approach the use of the oil is eliminated, and consequently the use of the soap is eliminated. The result is that the cooling holes remain unplugged, and that the cleanup of the turbine blades is much easier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for electrodischarge machining a workpiece, comprising the steps of
    furnishing a machining apparatus comprising
        a workpiece holder,
        an electrode holder having an electrode mounted thereto, and
        a power supply providing an electrical voltage and current;
    mounting the workpiece in the workpiece holder;
    positioning the electrode adjacent to a machining location of the workpiece;
    furnishing a source of a flow of conditioned water;
    directing the flow of conditioned water from the source into the machining location of the workpiece, without submerging the machining location in a liquid; and
    applying a voltage from the power supply such that metal is removed from the workpiece into the flow of conditioned water.

2. The method of claim 1, wherein the electrode is positioned vertically above the workpiece, and wherein the step of directing the flow of conditioned water includes the step of
    directing the flow of conditioned water over a surface of the electrode so that the conditioned water flows downwardly over the machining location and a surface of the workpiece.

3. The method of claim 1, wherein the step of furnishing a source of a flow of conditioned water includes the step of
    providing a plurality of water flow orifices in the electrode holder and positioned to direct the flow of water against a surface of the electrode.

4. The method of claim 1, wherein the machining location and the electrode are oriented vertically relative to each other.

5. The method of claim 1, wherein the electrode is positioned vertically above the workpiece, and wherein the step of furnishing a source of a flow of conditioned water includes the step of
    providing a plurality of water flow orifices in the electrode holder and positioned to direct the flow of water against a surface of the electrode.

6. The method of claim 1, wherein the source of conditioned water comprises
   a water flow orifice positioned to deliver conditioned water to the machining location,
   a reservoir of conditioned water positioned to catch conditioned water that drips from the workpiece, and
   a pump that receives conditioned water from the reservoir and delivers pressurized conditioned water to the water flow orifice.

7. The method of claim 1, wherein the workpiece is a gas turbine blade.

8. The method of claim 1, wherein the machining location is a tip of a gas turbine blade.

9. The method of claim 1, wherein the workpiece is not contacted by an oil and is not contacted by a detergent during the steps of directing and applying.

10. The method of claim 1, wherein the step of furnishing the source of the flow of conditioned water includes the step of
    furnishing partially deionized water having an electrical resistance of from about 10,000 to about 150,000 ohms per square centimeter.

11. A method for electrodischarge machining a workpiece, comprising the steps of
    furnishing a machining apparatus comprising
       a workpiece holder,
       an electrode holder having an electrode mounted thereto,
       a plurality of water flow orifices in the electrode holder, the water flow orifices begin positioned to direct a flow of water over a surface of the electrode holder, and
       a power supply providing an electrical voltage and current;
    mounting the workpiece in the workpiece holder;
    positioning the electrode adjacent to a machining location of the workpiece such that the electrode is vertically above the machining location;
    furnishing a pressure source of conditioned water in communication with the water flow orifices;
    directing a flow of conditioned water from the water flow orifices against the surface of the electrode such that conditioned water flows downwardly into the machining location of the workpiece, without submerging the machining location in a liquid; and
    applying a voltage from the power supply such that an electrical current flows between the workpiece and the electrode holder and metal is removed from the workpiece into the flow of conditioned water.

12. The method of claim 11, wherein the workpiece is a gas turbine blade.

13. The method of claim 11, wherein the machining location is a tip of a gas turbine blade.

14. The method of claim 11, wherein the workpiece is a gas turbine blade having a cooling hole in an airfoil surface thereof, and wherein the machining location is a tip of the gas turbine blade.

15. The method of claim 11, wherein the pressure source of conditioned water comprises
   a reservoir of conditioned water positioned to catch conditioned water that drips from the workpiece,
   a pump that receives conditioned water from the reservoir and delivers pressurized conditioned water to the water flow orifices, and
   a filter that removes impurities from the conditioned water.

16. The method of claim 11, wherein the step of furnishing the pressure source of conditioned water includes the step of
    furnishing partially deionized water having an electrical resistance of from about 10,000 to about 150,000 ohms per square centimeter.

17. The method of claim 11, wherein the workpiece is not contacted by an oil and is not contacted by a detergent during the steps of directing and applying.

18. A method for electrodischarge machining a workpiece, comprising the steps of
    furnishing a workpiece comprising a turbine blade having a tip and an airfoil section with an airfoil side surface;
    furnishing a machining apparatus comprising
       a workpiece holder that holds the turbine blade vertically so that the tip is uppermost,
       an electrode holder having an electrode mounted thereto and positioned vertically above the tip of the turbine blade with a gap therebetween,
       a plurality of water flow orifices in the electrode holder, the water flow orifices begin positioned to direct a flow of water downwardly over a surface or the electrode holder, into the gap, and over the airfoil side surface of the turbine blade, and
       a power supply providing an electrical voltage and current;
    mounting the workpiece in the workpiece holder;
    positioning the electrode adjacent to a machining location of the tip of the turbine blade such that the electrode is vertically above the machining location;
    furnishing a pressure source of conditioned water in communication with the water flow orifices;
    directing a flow of conditioned water from the water flow orifices against the surface of the electrode such that conditioned water flows downwardly into the gap and over the airfoil side surface of the workpiece, without submerging the machining location in a liquid; and
    applying a voltage from the power supply such that an electrical current flows between the workpiece and the electrode holder and metal is removed from the workpiece into the flow of conditioned water.

19. The method of claim 18, wherein the step of furnishing the pressure source of conditioned water includes the step of
    furnishing partially deionized water having an electrical resistance of from about 10,000 to about 150,000 ohms per square centimeter.

20. The method of claim 18, wherein the workpiece is not contacted by an oil and is not contacted by a detergent during the steps of directing and applying.

* * * * *